March 7, 1961 K. HENTKE 2,973,576
ELECTRIC CUTTING MACHINE
Filed Oct. 6, 1958 2 Sheets-Sheet 1
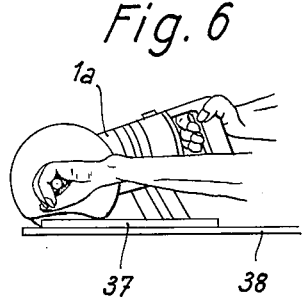
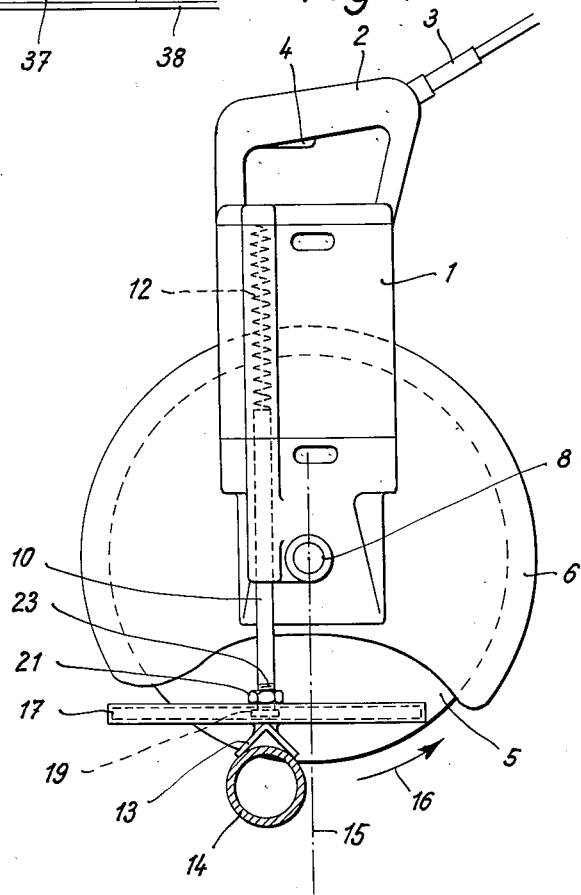
Inventor.
Kurt Hentke
by
Michael S. Striker
Attorney March 7, 1961 K. HENTKE 2,973,576
ELECTRIC CUTTING MACHINE
Filed Oct. 6, 1958 2 Sheets-Sheet 2
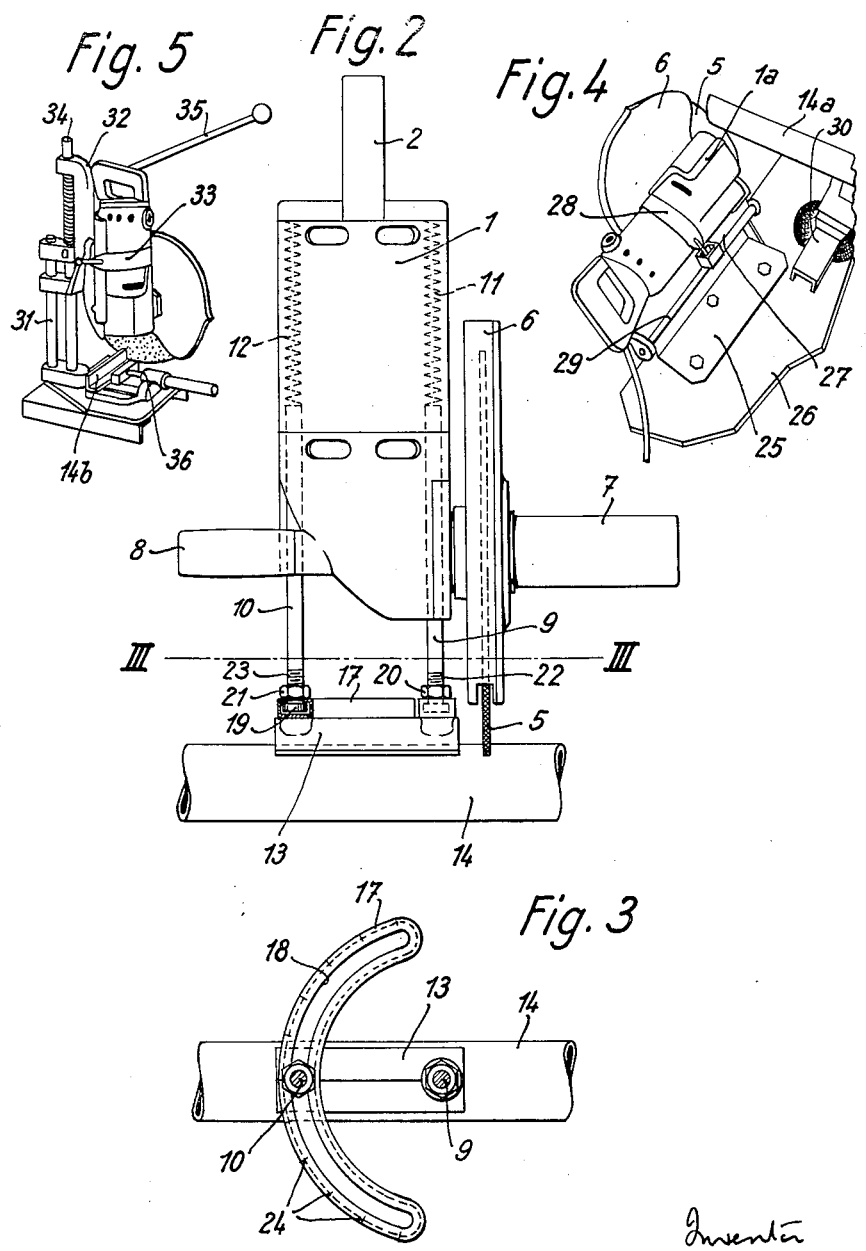

United States Patent Office 2,973,576
Patented Mar. 7, 1961

2,973,576

ELECTRIC CUTTING MACHINE

Kurt Hentke, Bremgarten, Switzerland, assignor to A. Kuster & Co. Werkzeugmaschinen, Zurich, Switzerland, a firm of Switzerland Filed Oct. 6, 1958, Ser. No. 765,533

Claims priority, application Germany Oct. 7, 1957

8 Claims. (Cl. 30—92)

The present invention relates to an electric cutting machine having a revolving cutting disk and a support for the machine which is connected to the housing and also serves as a work-engaging member or work stop.

A portable machine of this type in which a disklike cutting tool is driven by an electric motor has already been known prior to this invention. This machine was provided with a support which also served as a work-engaging member or work stop and was connected to the housing of the machine. However, it had the disadvantage that this support surrounded the cutting edge of the cutting tool and was rigidly secured to the housing of the machine without being adjustable relative thereto.

It is an object of the present invention to provide a portable electric cutting machine which is equipped with a support for the machine which also serves as a work-engaging member or work stop and is of such a design that it is located only at one side of the cutting disk and is also adjustable relative thereto. This results in the considerable advantage that the work stop which is formed by the support will adjust itself to the desired cutting depth of the tool. Since the work stop according to the invention is located at one side of the cutting disk, it is also possible to adjust the machine so as to cut workpieces at different angles.

Another feature of the invention consists in the fact that the support which serves as a work stop is mounted in such a manner on the housing of the machine that the cutting disk engages the workpiece at a point in front of the central vertical plane of the cutting disk, as seen in the direction of rotation thereof. Consequently, the cutting disk may penetrate the workpiece to a greater cutting depth.

Another feature of the invention consists in mounting the support within the machine housing in such a manner that it will be movable in the direction toward the axis of the cutting disk against the action of a spring.

Another feature of the invention consists in providing the support which serves as a work stop with a slide carriage which is rigidly connected to the machine housing and adjustable relative thereto so as to permit the cutting disk to be shifted to a vertical, horizontal or other angular position relative to the workpiece.

The support of the machine may, according to a further feature of the invention, be designed so as to form a stand along which the machine may be adjusted by means of its slide carriage which is rigidly secured to the machine housing and by means of an operating handle or the like.

Furthermore, the invention includes the provision of a pivotable mounting of the work stop whereby the latter may be adjusted in a very simple manner to various angular positions relative to the plane of the cutting disk by means of an arcuately shaped guide member. This device permits the machine to be very easily adjusted to carry out very exact cuts at any desired angle.

Further objects, features, and advantages of the present invention will be apparent from the following detailed description thereof which is to be read with reference to the accompanying drawings, in which—

Figure 1 shows a side view of the cutting machine according to the invention;

Figure 2 shows a side view of the machine as seen at a right angle to Figure 1;

Figure 3 shows a cross section taken along line III—III of Figure 2;

Figure 4 shows a perspective view of the machine provided with a slide carriage for using the machine on a work bench;

Figure 5 shows a perspective view of the machine mounted on a stand; while

Figure 6 shows a side view of the machine provided with a slide carriage for guiding the machine along a surface.

Referring to the drawings, the cutting machine according to the invention consists of a housing 1 containing an electric motor and a gearing, and provided with a handle 2 to which an electric cable 3 is connected for supplying an electric current to the motor. Handle 2 also serves as a housing for an electric switch 4 for operating the motor. The shaft on which the cutting disk 5 is mounted laterally of housing 1 extends transversely thereto, and cutting disk 5 is surrounded by a safety cover 6 with a further handle 7 thereon for holding and guiding the machine. At the opposite side of the housing the latter is provided with another handle 8 which may also be unscrewed therefrom.

As illustrated in Figures 1 to 3, a pair of supporting rods 9 and 10 are mounted within housing 1 so as to be slidable into the same against the action of compression springs 11 and 12. The front ends of these supporting rods 9 and 10 carry an angular V-shaped work-engaging or stop rail 13 which may be placed upon a workpiece 14, for example, a pipe to be cut by the cutting disk 5. Stop rail 13 then furnishes a good guiding support for the machine and it may be forced back against the action of springs 11 and 12 in accordance with the desired cutting depth of disk 5. Stop rail 13 is disposed on housing 1 laterally of cutting disk 5 so as to lie in front of the vertical plane 15 passing through the center of disk 5, as seen in the direction of rotation of the disk, as indicated by the arrow 15. Cutting disk 5 will therefore also engage the workpiece at a point in front of this plane 15.

If pipe 14 is not to be cut in a direction vertical to its longitudinal axis but at any other angle, stop rail 13 may then be accordingly adjusted relative to the plane of cutting disk 5. For this purpose, a curved slotted plate 17 is mounted on the upper side of rail 13 so that an enlarged end portion 19 on supporting rod 10 engages into the curved slot 18 of plate 17. The other supporting rod 9 is pivotably connected to rail 13 by a similar enlarged end portion on this rod. If nuts 20 and 21 are loosened on screw threads 22 and 23 on supporting rods 9 and 10, stop rail 13 may be adjusted to any desired angle in the slotted plate 17 which for this purpose is provided with a graduated scale 24. After the stop rail has been turned to the desired angle it may be fixed in such a position by tightening nuts 20 and 21. Such an adjustment of stop rail 13 relative to the plane of cutting disk 5 also adjusts the angular position of the disk relative to the workpiece 14 so that the cut therein will be made at the desired angle. After loosening nuts 20 and 21, stop rail 13 and the slotted plate 17 thereon may again be turned to any other desired angle or be returned to the central position, as indicated in Figures 1 to 3. In adjusting the stop rail, its supporting rod 9 serves as the pivotal axis, while the other supporting rod 10 serves as a guide.

As illustrated in Figure 4, the machine 1a may also be mounted on a support 25 which is bolted to a work bench 26. This support 25 carries a slide carriage 27 which is rigidly connected to the machine housing by means of a releasable clamping strap 28. Slide carriage 27 may be shifted back and forth along a slot 29 in support 25, preferably against the action of a spring, not shown. The machine 1a may thus be guided toward and away from the workpiece 14a which may be mounted in a vise 30 or other suitable clamping device on work bench 26.

For producing angular cuts, cutting machine 1a may also be mounted on its support 25 or carriage 27 so as to be pivotable about its longitudinal axis and to be secured in the desired angular position by suitable means, not shown.

As illustrated in Figure 5, the cutting machine may also be mounted on a stand 31 which is likewise provided with a carriage 32 on which the machine may be suspended by means of a releasable clamping strap 33. Carriage 32 with the machine thereon will be urged upwardly on a supporting rod 34 of stand 31 by the action of a strong spring 39, and it may be forced downwardly against the workpiece 14b to be cut which is clamped in a vise 36 or a similar clamping device.

Figure 6 finally shows the cutting machine as being mounted on a slidable support 37 which is likewise disposed at one side of the cutting disk 5. This support 37 may be placed upon a work surface 38 to be cut and be guided together with the machine along such surface so as to produce a perfect cut.

The cutting tool 5 may consist of a disk either with saw teeth or with a sharp cutting edge, and it may be made of any suitable material so as to be either rigid or flexible.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A portable cutting machine, comprising, in combination, motor means including a housing; a shaft turnably mounted in said housing and being adapted to be driven by said motor means, said shaft having a free end portion projecting laterally beyond said housing; a cutting disc located in a plane substantially normal to said shaft and mounted on said free end portion of said shaft for rotation therewith; support means supporting said housing, being arranged in its entirety at only one side of said plane of said cutting disc and including an engaging member adapted to engage a workpiece to be cut; and means for adjusting the position of said engaging member relative to said cutting disc, whereby said cutting disc may be used to cut off a portion of the workpiece while said portable cutting machine remains supported on the remainder of said workpiece.

2. A portable cutting machine comprising, in combination, motor means including an elongated housing having opposite ends; a shaft turnably mounted in said housing and being adapted to be driven by said motor means, said shaft being spaced further from one than from the other end of said elongated housing and having a free end portion projecting laterally beyond said housing; a cutting disc located in a plane substantially normal to said shaft and mounted on said free end portion of said shaft for rotation therewith and having a periphery extending beyond said other end of said elongated housing; support means supporting said housing, being arranged in its entirety at only one said of said plane of said cutting disc and including an engaging member adapted to engage a workpiece to be cut; and means for adjusting the position of said engaging member relative to said cutting disc, whereby said cutting disc may be used to cut off a portion of the workpiece while said portable cutting machine remains supported on the remainder of said workpiece.

3. A portable cutting machine comprising, in combination, motor means including a housing; a shaft turnably mounted in said housing and being adapted to be driven by said motor means in one direction, said shaft having a free end portion projecting laterally beyond said housing; a cutting disc located in a plane substantially normal to said shaft and mounted on said free end portion of said shaft for rotation therewith; support means supporting said housing, being arranged in its entirety at only one side of said plane of said cutting disc and including an engaging member adapted to engage a workpiece to be cut, said engaging member being located laterally from the axis of said shaft so that said cutting disc will engage a workpiece at a point in front of a central vertical plane passing through the axis of said shaft, as seen in direction of rotation of said shaft; and means for adjusting the position of said engaging member relative to said cutting disc, whereby said cutting disc may be used to cut off a portion of the workpiece while said portable cutting machine remains supported on the remainder of said workpiece.

4. A portable cutting machine comprising, in combination, motor means including a housing; a shaft turnably mounted in said housing and being adapted to be driven by said motor means, said shaft having a free end portion projecting laterally beyond said housing; a cutting disc located in a plane substantially normal to said shaft and mounted on said free end portion of said shaft for rotation therewith; support means supporting said housing, being arranged in its entirety at only one side of said plane of said cutting disc, said support means including an engaging member adapted to engage a workpiece, at least one connecting member projecting transversely from said engaging member and being guided in said housing so that said engaging member may be moved between an extended position and an end position in which said engaging member is spaced nearer from the axis of said shaft than in said extended position, and resilient means operatively connected to one of said members and tending to move said engaging member towards its extended position; and means for adjusting the position of said engaging member relative to said cutting disc, whereby said cutting disc may be used to cut off a portion of the workpiece while said portable cutting machine remains supported on the remainder of said workpiece.

5. A portable cutting machine comprising, in combination, motor means including an elongated housing having opposite ends; a shaft turnably mounted in said housing and being adapted to be driven by said motor means, said shaft being spaced further from one than from the other end of said elongated housing and having a free end portion projecting laterally beyond said housing, said housing being formed with a pair of spaced bores extending substantially normal to the axis of said shaft from said other end into said housing; a cutting disc located in a plane substantially normal to said shaft and mounted on said free end portion of said shaft for rotation therewith and having a periphery extending beyond said other end of said elongated housing; support means supporting said housing, being arranged in its entirety at only one side of said plane of said cutting disc, said support means including an engaging member adapted to engage a workpiece, a pair of rods projecting transversely from said engaging member and extending into said bores of said housing, respectively, to be guided therein so that said engaging member may be moved between an extended position and an end position in which said engaging member is spaced nearer from the axis of said shaft than in said extended position, and a pair of springs respectively located in said bores and engaging said rods and tending to move said engaging member connected to said rods to its extended position;

and means for adjusting the position of said engaging member relative to said cutting disc, whereby said cutting disc may be used to cut off a portion of the workpiece while said portable cutting machine remains supported on the remainder of said workpiece.

6. A portable cutting machine comprising, in combination, motor means including a housing; a shaft turnably mounted in said housing and being adapted to be driven by said motor means, said shaft having a free end portion projecting laterally beyond said housing; a cutting disc located in a plane substantially normal to said shaft and mounted on said free end portion of said shaft for rotation therewith; support means supporting said housing, being arranged in its entirety at only one side of said plane of said cutting disc and including a V-shaped engaging member adapted to engage a cylindrical workpiece to be cut; and means for adjusting the position of said engaging member relative to said cutting disc, whereby said cutting disc may be used to cut off a portion of the workpiece while said portable cutting machine remains supported on the remainder of said workpiece.

7. A portable cutting machine comprising, in combination, motor means including an elongated housing having opposite ends; a shaft turnably mounted in said housing and being adapted to be driven by said motor means, said shaft being spaced further from one than from the other end of said elongated housing and having a free end portion projecting laterally beyond said housing; a cutting disc located in a plane substantially normal to said shaft and mounted on said free end portion of said shaft for rotation therewith and having a periphery extending beyond said other end of said elongated housing; a first handle mounted on said one end of said elongated housing projecting therefrom; a second handle coaxial with said shaft axis and extending beyond the free end portion thereof; support means supporting said housing, being arranged in its entirety at only one side of said plane of said cutting disc and including an engaging member adapted to engage a workpiece to be cut; and means for adjusting the position of said engaging member relative to said cutting disc, whereby said cutting disc may be used to cut off a portion of the workpiece while said portable cutting machine remains supported on the remainder of said workpiece.

8. A portable cutting machine comprising, in combination, motor means including an elongated housing having opposite ends; a shaft turnably mounted in said housing and being adapted to be driven by said motor means, said shaft being spaced further from one than from the other end of said elongated housing and having a free end portion projecting laterally beyond said housing, said housing being formed with a pair of spaced bores extending substantially normal to the axis of said shaft from said other end into said housing; a cutting disc located in a plane substantially normal to said shaft and mounted on said free end portion of said shaft for rotation therewith and having a periphery extending beyond said other end of said elongated housing; support means supporting said housing, being arranged in its entirety at only one side of said plane of said cutting disc, said support means including a pair of rods respectively extending with the upper end portions thereof into said bores of said housing to be slidably guided therein, an engaging member adapted to engage a workpiece and extending between the lower ends of said rods, said engaging member being mounted on one of said rods turnable about the axis thereof, means fixed to said engaging member for locking said engaging member in any turned position on the other rod, and resilient means located in said bores engaging said rods and tending to move said engaging member to an extended position in which said engaging member is further spaced from the axis of said shaft than in a rest position.

References Cited in the file of this patent

UNITED STATES PATENTS

| | | |
|---|---|---|
| 1,894,010 | Tautz | Jan. 10, 1933 |
| 2,160,274 | Lopez | May 30, 1939 |
| 2,176,646 | Thatcher | Oct. 17, 1939 |
| 2,638,944 | Woleslagle | May 19, 1953 |
| 2,737,065 | Piersall | Mar. 6, 1956 |